(12) United States Patent
Hikichi et al.

(10) Patent No.: US 7,538,945 B2
(45) Date of Patent: May 26, 2009

(54) OPTICAL PATH CHANGING MODULE

(75) Inventors: Naoko Hikichi, Tokyo (JP); Kenichi Nakama, Tokyo (JP); Yasunori Arima, Tokyo (JP)

(73) Assignee: Nippon Sheet Glass Company, Limited, Tokyo (JP)

( * ) Notice: Subject to any disclaimer, the term of this patent is extended or adjusted under 35 U.S.C. 154(b) by 408 days.

(21) Appl. No.: 11/318,588

(22) Filed: Dec. 28, 2005

(65) Prior Publication Data

US 2006/0153023 A1     Jul. 13, 2006

(30) Foreign Application Priority Data

Jan. 7, 2005    (JP) .......................... P2005-002136
Feb. 22, 2005   (JP) .......................... P2005-045687

(51) Int. Cl.
*G02B 5/18* (2006.01)
(52) U.S. Cl. .................. 359/569; 359/566; 385/38; 398/87
(58) Field of Classification Search .................. None
See application file for complete search history.

(56) References Cited

U.S. PATENT DOCUMENTS

| 6,724,533 B2 * | 4/2004 | Hoose et al. ................. 359/572 |
| 7,230,761 B2 * | 6/2007 | Arns ........................... 359/566 |
| 2003/0215182 A1 * | 11/2003 | Lin et al. ...................... 385/37 |

FOREIGN PATENT DOCUMENTS

| JP | 2004-085913 | 3/2004 |
| WO | WO/9946628 | 9/1999 |

* cited by examiner

*Primary Examiner*—Arnel C Lavarias
(74) *Attorney, Agent, or Firm*—Whitham Curtis Christofferson & Cook, PC

(57) ABSTRACT

An optical module can achieve an optical system using a transmission-type diffraction grating for bending the optical path of incident light with a specific wavelength by about 90°. A substrate of the transmission-type diffraction grating is mounted at an angle in a range of ±5° with respect to the design incident angle α of the incident light. The optical system can be applied to a light multiplexing/demultiplexing module.

8 Claims, 12 Drawing Sheets

DISPLACEMENT OF MOUNTING ANGLE (°)

OPTICAL PATH CHANGING MODULE

BACKGROUND OF THE INVENTION

1. Field of the Invention

The present invention generally relates to an optical module used in the field of wavelength division multiplexing optical communication technology and in the field of spectrometric technology. One aspect of the invention relates to an optical path changing optical system in an optical module. Further, another aspect of the invention relates to a mechanism for holding optical parts constituting an optical module.

2. Description of Related Art

On the other hand, in the field of spectrometric technology, a diffraction grating is used widely for analyzing spectra of light in a spectrometric apparatus. Spectrometric analysis requires high efficiency in utilization of energy in a wide frequency band. A reflection-type diffraction grating is suitable for obtaining high diffraction efficiency in a wide frequency band. The reflection-type diffraction grating is used widely in a spectrometric apparatus because the reflection-type diffraction grating is good in the ratio of change in diffraction angle to the wavelength of light, that is, in wavelength-angle dispersion characteristic (e.g. see Tadao Tsuruta, "Applied Optics 1", Baifukan Co., Ltd, 1990, p. 307).

Particularly in the field of environmental measurement or the like, there is an increasing demand for a small-size spectrometric apparatus which can be carried to a job site and which can perform measurement on the site. Several small-size sensors for measuring the optical spectra of a liquid flowing in a fine flow path or evaluating the property such as pH of the liquid by using the optical spectra of the liquid have been proposed and a small-size spectrometric apparatus has been used in the field of environmental measurement.

Also in the small-size spectrometric apparatus used for these purposes, a reflection-type diffraction grating is used as a spectral distributing element in the same manner as in the large-size spectrometric apparatus according to the related art. Generally, a mirror or the like is used for contriving an optical system to achieve reduction in size of the spectral distributing function.

A diffraction grating is further used in a light demultiplexer in the field of wavelength-division multiplexing optical communication. When a reflection-type diffraction grating is used for aligning the optical axis of incident light and the optical axis of diffracted light on a line approximately, that is, when an optical system of so-called Littrow arrangement is formed, a small-size light demultiplexing module can be achieved (e.g. see International Patent Publication No. 99/46638 Pamphlet).

The reflection-type diffraction grating however has such a property that the positional relation between incident light and diffracted light varies sensitively with dependence on the mounting angle of the diffraction grating. For example, as shown in FIG. 16, incident light 402 containing wavelength components $\lambda 1$, $\lambda 2$ and $\lambda 3$ is collimated to parallel light beams 404 by a lens 430 and then incident on the reflection-type diffraction grating 410. The light beams diffracted by the diffraction grating 410 outgo in different directions in accordance with the wavelengths. For example, the diffracted light beam component of the wavelength $\lambda 2$ outputs in a direction in which the angle (diffraction angle) between the optical axis 407 of the diffracted light beam component and a perpendicular line 405 drawn from a substrate 412 of the diffraction grating is $\beta 2$. The diffracted light is converged so as to be incident on an element 420-2 such as a photodetector of a diffracted light detection device 420.

When the angle (incident angle) $\alpha$ between the optical axis 403 of incident light and the perpendicular line 405 drawn from the diffraction grating substrate 412 changes on this occasion, the angle (angle $\gamma 2$ for the diffracted light with the wavelength $\lambda 2$ in the aforementioned example) between the optical axis 403 of incident light and the optical axis 407 of diffracted light also changes. It is therefore necessary to adjust the mounting angle of the diffraction grating strictly relative to incident light and adjust the mounting position of the diffracted light detection device strictly. There is a problem that it is difficult to assemble an optical module.

Also for this reason, in the optical module using the reflection-type diffraction grating, a complex mechanism for adjusting the positions of respective parts needs to be provided in a housing of the module or an adhesion/fixation space for holding an element needs to be reserved in advance. Accordingly, there is a problem that the size of an apparatus using the optical module is increased.

Turning to the field of opto-electronics, the development of technique has advanced for partially replacing the electric signal transmission/signal processing between devices or in a device with the optical signal transmission/processing. Such a technique needs an inter-conversion device between the optical signal and the electric signal as well as signal transmitting and processing device for transmitting and processing the optical signal and the electric signal respectively. Therefore, if optical elements and electronic elements taking charge of these functions are mixedly mounted on a board so that both optical signal and electric signal can be transmitted, processed and inter-converted on one and the same board, it is possible to enjoy a lot of advantages such as improvement in efficiency of signal processing and reduction in device size. In a so-called opto-electronic hybrid circuit board where the optical elements and the electric elements are mixedly mounted, it is necessary to provide an optical system by which light propagating in a light pipe such as an optical fiber, an optical waveguide, etc., or propagating in a space can be received by a flat photodetecting element mounted in the board or light emitted from a flat light-emitting element mounted on the board can be taken out to a light pipe or a spatial optical path mainly in a portion of conversion between the optical signal and the electric signal.

It is preferable from the viewpoint of an easy layout and a small mounting space that the optical fiber, the optical waveguide and the spatial optical path are arranged so that the optical axes of these are in parallel to the board. On the other hand, the optical element for performing inter-conversion between the optical signal and the electric signal is mounted on the board. Therefore, in an optical system having such optical arrangement, a so-called flat optical element having incident and output surfaces parallel to the board surface is preferably used so that the optical path parallel to the board is bent by 90° so as to be connected perpendicularly to the flat optical element mounted on the board.

Although the angle for changing the optical path may be an acute angle or an obtuse angle other than 90°, this case brings lowering of efficiency and difficulty of adjusting because incidence/output on/from the optical element has an inclination angle. If light is intended to be incident/outgo perpendicularly on/from the optical element, complexity in device configuration and increase in device size are brought because the optical path of propagating light cannot be made in parallel with the board surface.

It is however unnecessary to adjust the optical path changing angle to 90° accurately. Even in the case where an angle several degrees far from 90° is selected as the design bending angle, the aforementioned problem does not become so actual if the mounting structure of each optical element is designed in accordance with the angle. The "90° optical path change" in the following description means roughly 90° optical path change including variation in such a width of several degrees.

The 90° optical path change can be achieved when reflection of light is used. Generally, it can be achieved by use of a mirror or prism (e.g. see Japanese Patent Publication No. 2004-85913A).

In the opto-electronic hybrid circuit board, a slight difference in optical path causes a large light loss because the beam diameter of light to be used, the core diameter of the light pipe to be coupled, the area of the photodetecting surface of the flat photodetecting element, and so on, are small. For this reason, a high degree of precision is required for the mounting angle, the angle of a reflection surface or surface accuracy in order to perform the 90° optical path change. There arises a problem that a complex assembling or producing process is required.

SUMMARY OF THE INVENTION

The invention is provided to solve these problems. An object of the invention is to provide an optical module which is easy to assemble so that the size of the optical module can be reduced because it is unnecessary to provide any complex alignment mechanism.

More specifically, the invention is related to provide an optical module in which mechanical accuracy in a 90° optical path changing optical system to make an assembling process easy.

To solve the aforementioned problem, one aspect of the invention provides an optical module including an optical system using a diffraction optical element for bending an optical axis of an incident light beam with a specific wavelength at about 90°. A transmission-type diffraction grating is preferred as the diffraction optical element. If the wavelength can be specified, bending of the optical path by diffraction is easier for mounting and assembling than bending of the optical path by reflection.

Preferably, the number N of grooves in the transmission-type diffraction grating to be used is set to a value represented by the formula:

$$N=\pm(\cos \alpha+\sin \alpha)/(m\lambda)$$

in which ± is the same sign as that of m when an mth-order diffracted light beam (m is an integer) is used in the condition that incident light with a wavelength λ contained in the light inputted from the light input device is made incident at an incident angle α on the transmission-type diffraction grating. When the diffraction grating satisfying this relation is used, it is possible to form an optical system in which diffracted light is bent by about 90° with respect to incident light at an incident angle of 45°. Namely, when the light beam with the wavelength λ is incident at the incident angle α on the transmission-type diffraction grating, the transmission-type diffraction grating outputs an mth-order diffracted light beam with the optical path changed by 90°.

Preferably, a substrate of the transmission-type diffraction grating is mounted at an angle in a range of α±5° with respect to the incident light beam. When the diffraction grating is fixed within this angle range, an optical module with a low loss can be provided.

In the optical module, the substrate of the transmission-type diffraction grating is mounted at an angle in a range of α+Δθ with respect to the incident light beam, and a light beam diffracted by the transmission-type diffraction grating is converged by a lens with a focal length f so as to be incident on a photodetector having a photodetecting surface with a width W along a direction of the incident light beam. Incidentally, there is satisfied the relation:

$$\tan |\Delta\theta| \leq W/2f$$

When the diffraction grating is fixed within this angle range in the condition that a photodetector having a photodetecting surface with a width W is used, an optical module with a low loss can be provided.

In addition to the aforementioned configuration, the optical module according to the invention further includes: a light input device for making a light beam with multiplexed wavelengths incident on the transmission-type diffraction grating using one of the wavelengths as the specific wavelength; and a plurality of photodetectors for receiving respective light beams each having a single wavelength demultiplexed by the transmission-type diffraction grating and output from the transmission-type diffraction grating. By this configuration, a demultiplexing module easy to assemble and small in size can be formed.

Preferably, the light input device for making the light beam incident on the transmission-type diffraction grating is an optical fiber or waveguide which is fixed so that its optical axis is in parallel with the substrate; the transmission-type diffraction grating is fixed so that the light beam with the specific wavelength outputs in a direction approximately perpendicular to the substrate when the light beam is incident on the transmission-type diffraction grating; and the photodetector for receiving respective light beams each having a single wavelength output from the transmission-type diffraction grating are a plurality of flat photodetecting elements which are arranged, in parallel to the optical axis, in respective positions where the light beams each having single wavelength output from the transmission-type diffraction grating reach the substrate. When such constituent members are used, a demultiplexing module easy to assemble and small in size can be provided.

The optical module according to the invention further includes: a plurality of light-emitting devices for emitting light beams with different wavelengths; and a photodetector for receiving a light beam with multiplexed wavelengths output from the transmission-type diffraction grating such that the light beams emitted from the plurality of light-emitting devices are multiplexed by the transmission-type diffraction grating, wherein the specific wavelength is one of the wavelengths. By this configuration, a multiplexing module easy to assemble and small in size can be formed.

The optical module according to the invention further includes: a light input device for making a light beam having continuous wavelength spectra in a predetermined wavelength range incident on the transmission-type diffraction grating; and a photodetector for receiving a light beam with a predetermined wavelength spectrally distributed by the transmission-type diffraction grating and output from the transmission-type diffraction grating, wherein the specific wavelength is in the predetermined wavelength range of the incident light beam. When such constituent members are used, a spectral distributing module easy to assemble and small in size can be provided.

Preferably, the optical module according to the invention further includes a collimator for substantially collimating the light beam incident on the diffraction optical element. Preferably, the optical module according to the invention further includes a converging device for converging the light beam output from the diffraction optical element.

According to the configuration of the above aspect of the invention, the degree of precision required for the mounting angle of an element can be relaxed greatly compared with the case where a mirror is used. Accordingly, an assembling process can be made easily.

When a plurality of incident wavelengths are provided, both demultiplexing and optical path changing can be performed simultaneously. Accordingly, a spectral distributing element and a mirror can be integrated so that the number of parts can be reduced.

Another aspect of the invention provides an optical module using a diffraction grating, comprising:

a first cylindrical holding member having a first hollow portion;

a second cylindrical holding member having a second hollow portion;

a diffraction grating provided between the first and second cylindrical holding members;

a light input device held by the first holding member in the first hollow portion so that the first hollow portion forms an optical path of incident light;

a diffracted light detection device connected to an end portion of the second holding member opposing to the diffraction grating so that the hollow portion of the second holding member forms an optical path of diffracted light;

wherein the diffraction grating is fixed so that a light incidence surface of the diffraction grating abuts on an end portion of the first holding member and a light output surface of the diffraction grating abuts on an end portion of the second holding member.

Preferably, a transmission-type diffraction grating may be served. Because the use of the transmission-type diffraction grating permits reduction in the ratio of change in the angular relation between incident light and diffracted light in accordance with the mounting angle of the diffraction grating, it is not necessary to adjust the angle of the diffraction grating strictly. In addition, because the diffraction grating is held by mechanical clamping, it is possible to omit any complex process of positioning the diffraction grating, aligning the diffraction grating and then adhesively fixing the diffraction grating.

Preferably, a sum of the angle between an end surface at the end portion of the first holding member abutting on the diffraction grating and a axial direction of the cylinder of the first holding member and an angle between an end surface at the end portion of the second holding member abutting on the diffraction grating and an axial direction of the cylinder of the second holding member is within a range of an angle between the incident light and the diffracted light. According to this configuration, when the transmission-type diffraction grating is fixed while put between the two holding members, there can be obtained a spectrometric optical system in which incident light and diffracted light are bent at a predetermined angle from each other.

Preferably, the light input device includes a collimator. Because the collimator is provided, light can be collimated to parallel light beams in the module by the collimator so as to be incident on the diffraction grating in the case where a divergent light source is used.

Preferably, the second holding member holds a converging device in its hollow portion. Because the converging device is provided, diffracted light can be converged in the module by the converging device so as to be incident on the diffracted light detection device efficiently.

Preferably, the first holding member has a mechanism for adjusting the collimator. According to this configuration, positions and angles in directions parallel and perpendicular to the optical axis can be adjusted without addition of any alignment or adhesion/fixation space into a housing in which the optical module is incorporated. Great reduction in the size of the optical module can be achieved.

Preferably, a connection portion between the second holding member and the diffracted light detection device is fitted to a holding member for holding the diffracted light detection device so that the connection portion can rotate around the optical axis. According to this configuration, position adjustment in a direction of rotation around the optical axis can be performed without addition of any alignment or adhesion/fixation space into a housing in which the optical module is incorporated. Great reduction in the size of the optical module can be achieved.

Preferably, the light input device has an optical fiber, and a planoconvex lens. Or the light input device has an optical fiber, and a graded index rod lens. When these constituent parts are used, a collimator integrated with a holding member can be formed.

Preferably, the converging device is a planoconvex lens. The use of this constituent part permits provision of a converging device integrated with a holding member.

Preferably, the diffracted light detection device is a photodetector array. The use of this constituent part permits reduction in size of the optical module to thereby make it possible to complete the spectral distributing function in the optical module.

According to the configuration of the invention, it is possible to provide an optical module in which the diffraction grating can be positioned and mounted only by a mechanical fitting operation without originally very complex adjustment of the mounting position of the diffraction grating.

Moreover, because a mechanism for aligning the diffracted light detection device is incorporated, the assembling process can be simplified greatly.

In addition, because it is not necessary to separately provide any special optical element positioning mechanism or any adhesion/fixation space in the housing of the optical module, great reduction in size of the optical module can be achieved.

DETAILED DESCRIPTION OF THE PREFERRED EMBODIMENTS

Figure 1:
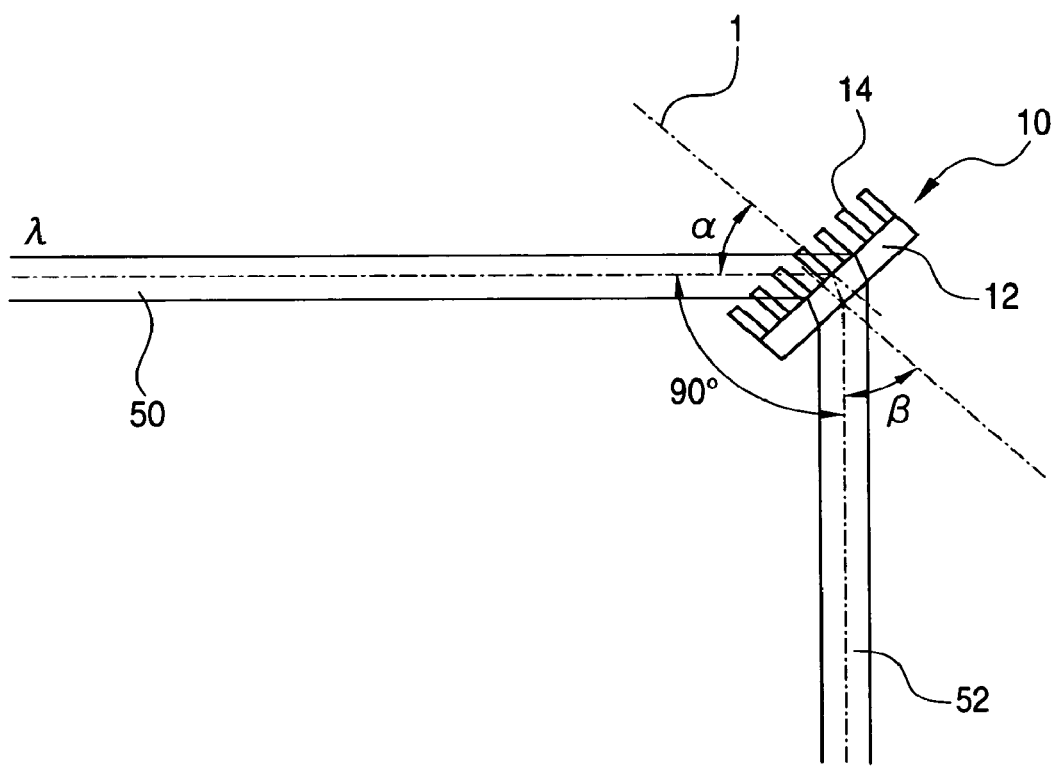
FIG. 1 is a view showing a 90° optical path changing optical system according to the invention.

FIG. 1 shows the basic configuration of an embodiment according to the invention. In the invention, a diffraction optical element is used for changing an optical path. In the example shown in FIG. 1, a transmission-type diffraction grating 10 having periodic grooves (grids) 14 formed on a flat transparent substrate 12 is used as the diffraction optical element.

In the case of a diffraction grating, an incident angle $\alpha$ which is an angle between an incident light beam 50 and a perpendicular line 1 drawn from a surface of a diffraction grating substrate and an output angle (diffraction angle) $\beta$ which is an angle between an output light beam (diffracted light beam) 52 and a perpendicular line 1 drawn from the surface of the diffraction grating substrate have a relation represented by the following expression:

$$\sin \beta = \sin \alpha + Nm\lambda \qquad (1)$$

in which N is the number of grooves in the diffraction grating, m is the order of diffraction, and $\lambda$ is the wavelength of the incident light beam.

To change the optical path by 90°, it is necessary to satisfy the relation represented by the following expression.

$$\alpha + |\beta| = 90° \qquad (2)$$

Because the expression (2) can be replaced by $\sin \beta = -\cos \alpha$, this relation is put in the expression (1) so that the number N of grooves in the diffraction grating can be given by the following expression:

$$N = -(\cos \alpha + \sin \alpha)/(m\lambda) \qquad (3)$$

That is, the number of grooves in the diffraction grating can be decided according to the expression (3) if the incident angle $\alpha$, the specific wavelength $\lambda$ and the order m of diffraction to be used are given as design values. When, for example, an incident light beam needs to be incident at an incident angle $\alpha = 45°$ on the grating surface side of a transmission-type diffraction grating, a negative first order diffracted light beam can be extracted at a diffraction angle $\beta = -45°$ from the rear surface of the substrate to thereby achieve the 90° optical path change if the diffraction grating used has a number of grooves represented by the expression:

$$N = \sqrt{2}/\lambda \qquad (4)$$

Figure 14:
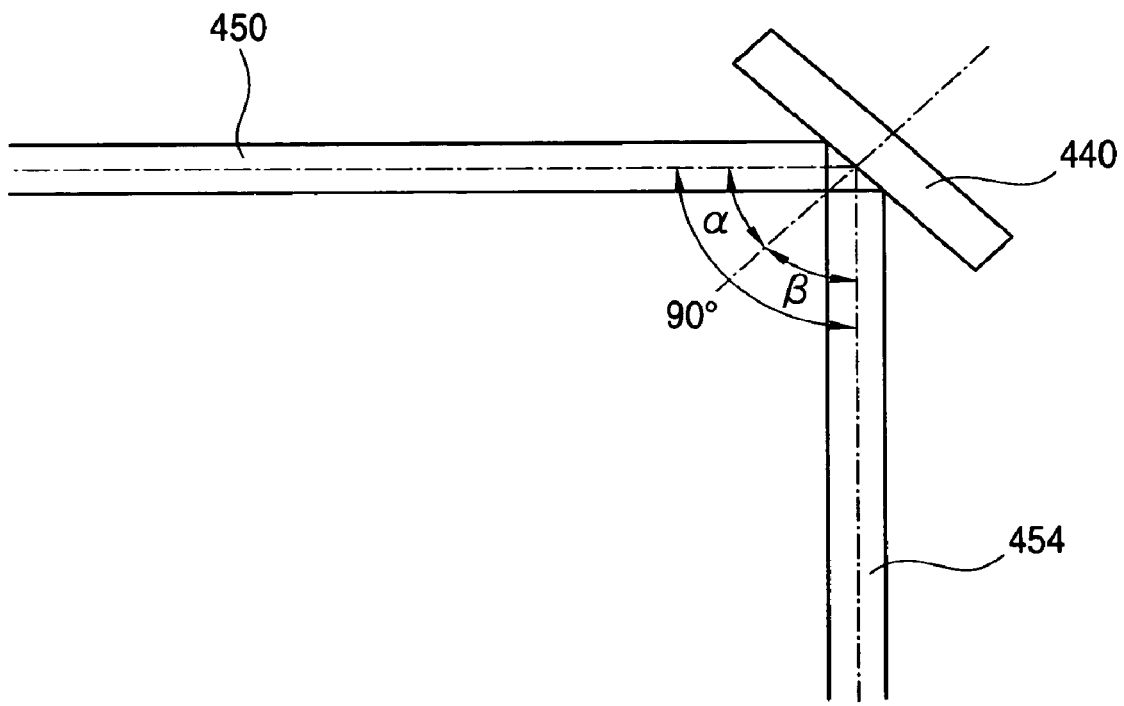
FIG. 14 is a view showing a 90° optical path changing optical system according to the related art.

On the other hand, FIG. 14 shows a related-art optical system using a mirror 440 for bending the optical path of an incident light beam 450 by 90° to obtain a reflected light beam 454. In the case of a mirror, the condition $\alpha = \beta = 45°$ is required for achieving the 90° optical path change.

To achieve the aforementioned optical system, it is necessary to accurately fix the diffraction grating substrate or mirror at an angle $\alpha$ with respect to the direction of the incident light beam. Consider now the case where the mounting angle is shifted by $\Delta\theta$.

Figure 2:
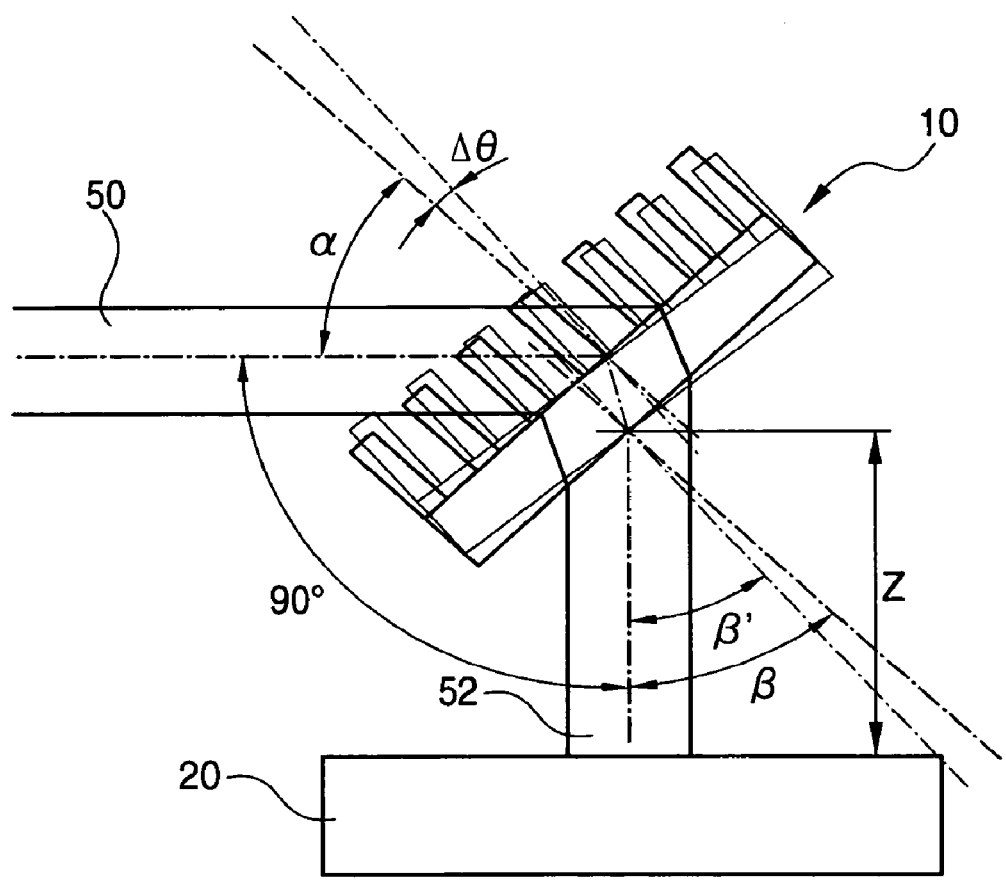
FIG. 2 is an enlarged view showing a substantial part of the optical system according to the invention.

In the case of a diffraction grating, when the incident angle $\alpha$ of the incident light beam 50 changes to $\alpha + \Delta\theta$ as shown in FIG. 2, the output angle $\beta'$ of the diffracted light beam 52 changes by a value given by the expression (1), that is, on the basis of the following expression (5):

$$\sin \beta' = \sin(\alpha + \Delta\theta) + Nm\lambda \qquad (5)$$

Table 1 shows the incident angle $\alpha + \Delta\theta$, the output angle $\beta'$ and the angle between the incident light beam and the output light beam, which are calculated by the expression (5) when the element mounting angle is shifted by $\Delta\theta$.

Incidentally, the number N of grooves in the diffraction grating 10 is set to 900 per mm and a collimated light beam with a wavelength $\lambda = 1570$ nm is used as the incident light beam. In this case, the negative first order diffracted light beam ($m = -1$) satisfies the expression (4) if $\alpha = |\beta| = 45°$. In the case of this diffraction grating, it is found that the quantity of optical path change can be kept 90° even when the mounting angle is shifted by 3°. That is, $\beta'$ can be kept approximately equal to $\beta - \Delta\theta$ when the mounting angle is within the angle range $\alpha \pm 3°$. If the bending angle is permitted to be within the angle range $90° \pm 20°$, the mounting angle can be permitted to be within the range $\alpha \pm 5°$.

Figure 15:
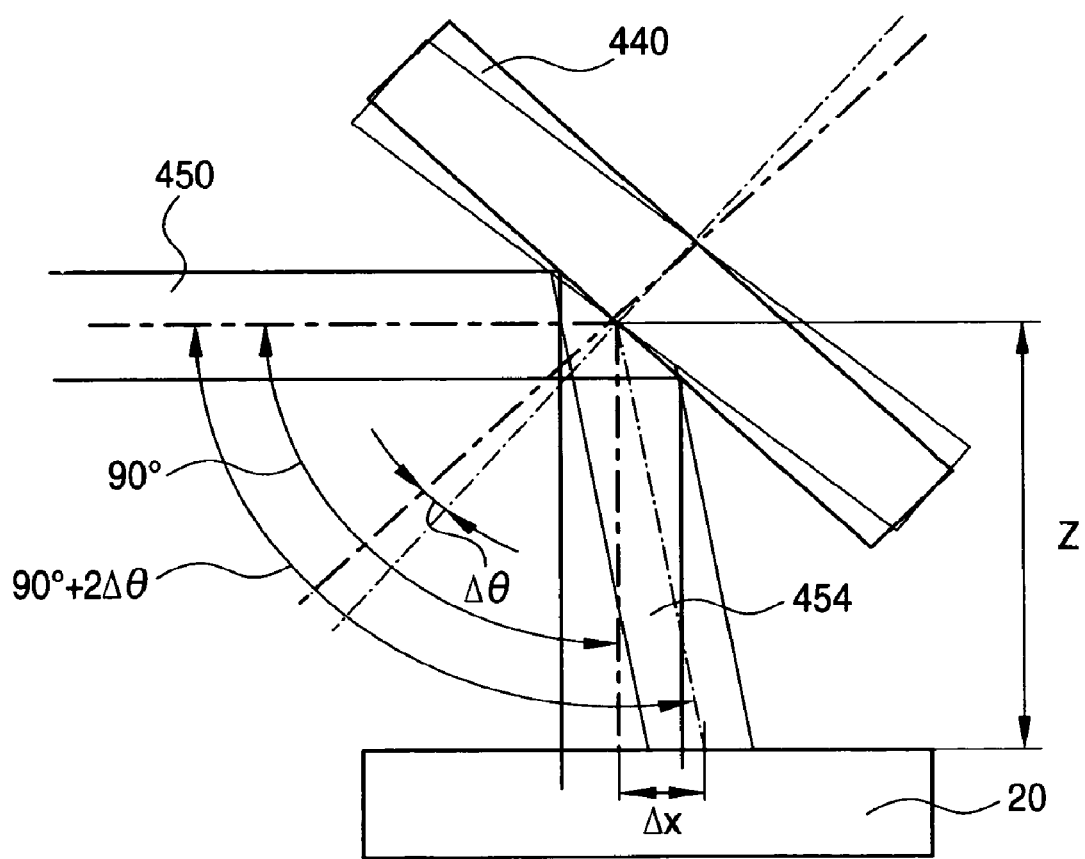
FIG. 15 is an enlarged view showing a substantial part of the optical system according to the related art.

On the other hand, in the case of a mirror, as shown in FIG. 15, when the mounting angle is shifted by $\Delta\theta$ from 45° with respect to the optical axis of the incident light beam, that is, when the mounting angle changes to $45° + \Delta\theta$, the reflection angle is also shifted by $\Delta\theta$ from 45°, that is, the reflection angle changes to $45° + \Delta\theta$. As a result, the angle between the incident light beam and the output light beam is shifted by $2\Delta\theta$ from 90°. Table 2 shows numerical values calculated in the case of a mirror in the same manner as in the case of a diffraction grating for the sake of comparison. It is found that the quantity of optical path change is shifted to 96° when $\Delta\theta$ is equal to 3°.

In the optical module according to the invention, the light beam bent by 90° is incident on the photodetector 20. The photodetector 20 may be photodetectors such as photodiodes or may be optical fibers. Because the light beam incident at the incident angle $\alpha$ on the diffraction grating is bent by 90°, a photodetecting surface of each photodetector can be disposed in the position on which the diffracted light beam is incident.

Let Z be the distance from the diffraction grating or mirror to the photodetecting surface of the photodetector 20. When, for example, Z is equal to 3 mm, the positional displacement $\Delta x$ of the optical axis on the photodetecting surface relative to the displacement $\Delta\theta$ of the mounting angle can be ignored in the case of the diffraction grating but reaches 315 μm in the case of the mirror. It is apparent from this result that permissible mounting angle error in the diffraction grating is sufficiently larger than that in the mirror.

Figure 3:
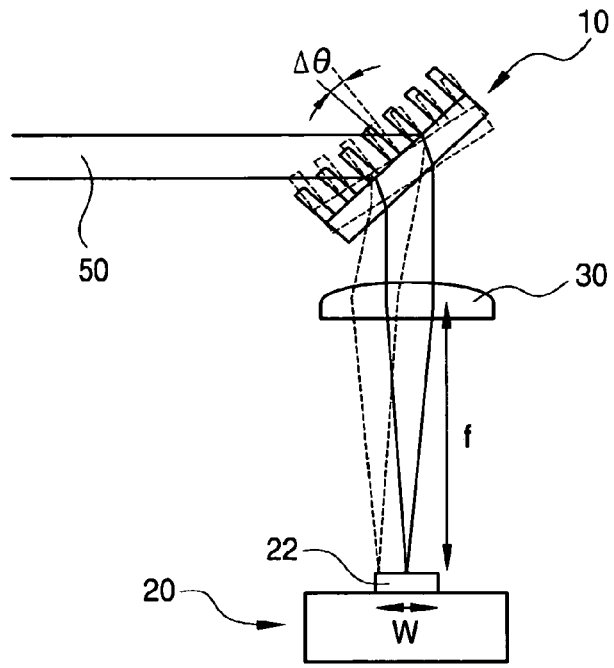
FIG. 3 is a view showing a basic optical system of an optical module according to the invention.

Let W be the width of an effective photodetecting surface 22 of the photodetector 20 used here. The width of the effective photodetecting surface 22 is a width along the direction of the incident light beam 50. When the photodetecting surface is relatively small compared with the light flux, a converging device 30 such as a lens is preferably provided between the diffraction grating 10 and the photodetector 20 as shown in FIG. 3. As described above, in the case of the diffraction grating, the output angle is shifted by $-\Delta\theta$ approximately when the incident angle is shifted by $\Delta\theta$. Accordingly, the optical axis of light incident on the converging device (lens) 30 is shifted by $-\Delta\theta$ with respect to the principal axis of the lens. This light is focused on a position far by f×tan (Δθ) from the axis of the lens when f is the focal length of the lens.

The positional displacement of the light spot must be not longer than W/2 so that the center of the effective photodetecting surface of the photodetector such as photodiodes can be located on the principal axis of the lens while the loss between the lens and the photodetector can be reduced to a value not higher than 3 dB. Accordingly, the loss caused by the displacement Δθ of the diffraction grating mounting angle can be reduced to a value not higher than 3 dB when there is satisfied the following expression (6):

$$|\tan(\Delta\theta)| \pm W/(2f) \tag{6}$$

Incidentally, this relation can be applied to a mirror in the case where the angular displacement of the reflected light coincides with Δθ.

An effect caused by the displacement of the mounting angle will be described below on the basis of a specific example.

Diffracted light is converged by a lens and received by a photodetector (photodiode) having an effective photodetecting surface with a size of 35 μm×100 μm (W=35 μm). The focal length f of the converging lens is 7.96 mm. The diameter of the light spot in the best focusing position of light with a wavelength λ=1570 nm is about 14 μm.

Figure 4:
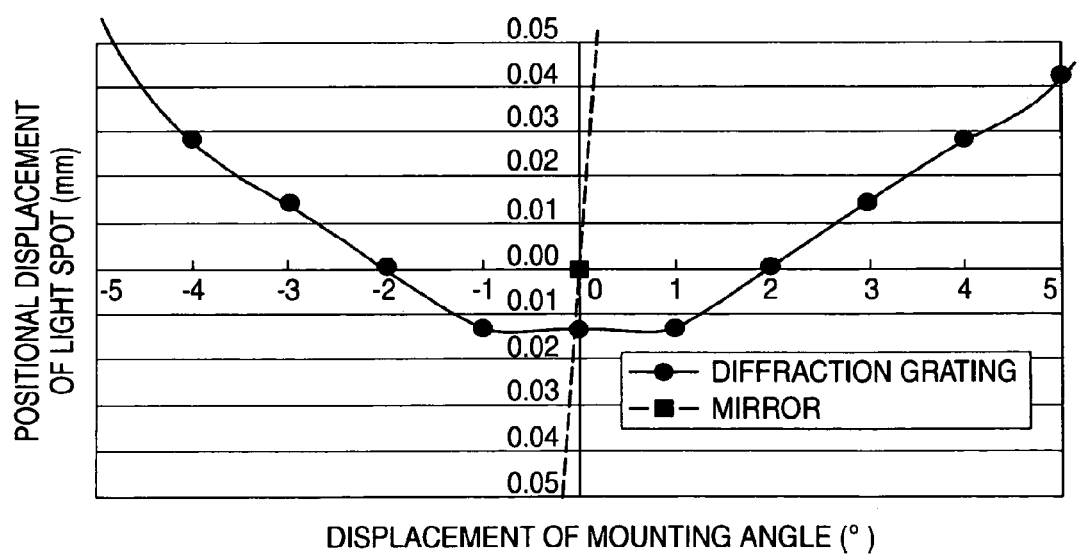
FIG. 4 is a graph showing permissible error of a diffraction grating or mirror mounting angle.

FIG. 4 shows the relation between the displacement of the mounting angle and the positional displacement of the light spot. To reduce the loss between the lens and the photodiode to a value not higher than 3 dB, the displacement of the mounting angle needs to be within the range of about ±3° in the case of the diffraction grating and within the range of about ±0.07° in the case of the mirror. It is apparent from this fact that the permissible angle error in the diffraction grating is not smaller than 40 times he permissible angle error in the mirror.

TABLE 1

| Item | Unit | Value | | |
|---|---|---|---|---|
| Δθ | ° | 0 | 1 | 3 |
| Incident angle | ° | 45 | 46 | 48 |
| Output angle | ° | −45 | −44 | −42 |
| Angular change quantity | ° | 90 | 90 | 90 |
| Angular displacement | ° | 0 | 0 | 0 |
| Positional displacement Δx: z = 1 mm | μm | 0 | 0 | 0 |
| Positional displacement Δx: z = 3 mm | μm | 0 | 0 | 0 |

TABLE 2

| Item | Unit | Value | | |
|---|---|---|---|---|
| Δθ | ° | 0 | 1 | 3 |
| Incident angle | ° | 45 | 46 | 48 |
| Output angle | ° | −45 | −46 | −48 |
| Angular change quantity | ° | 90 | 92 | 96 |
| Angular displacement | ° | 0 | 2 | 6 |

TABLE 2-continued

| Item | Unit | Value | | |
|---|---|---|---|---|
| Δθ | ° | 0 | 1 | 3 |
| Positional displacement Δx: z = 1 mm | μm | 0 | 35 | 105 |
| Positional displacement Δx: z = 3 mm | μm | 0 | 105 | 315 |

Next, description is made in a case that incident light 4 is approximately parallel light beams containing plural wavelength components. In this case, the incident light 4 is diffracted by the diffraction grating, is converged by a converging device 40, and is detected by a diffracted light detection device 20-1, 20-2, 20-3.

Figure 5:
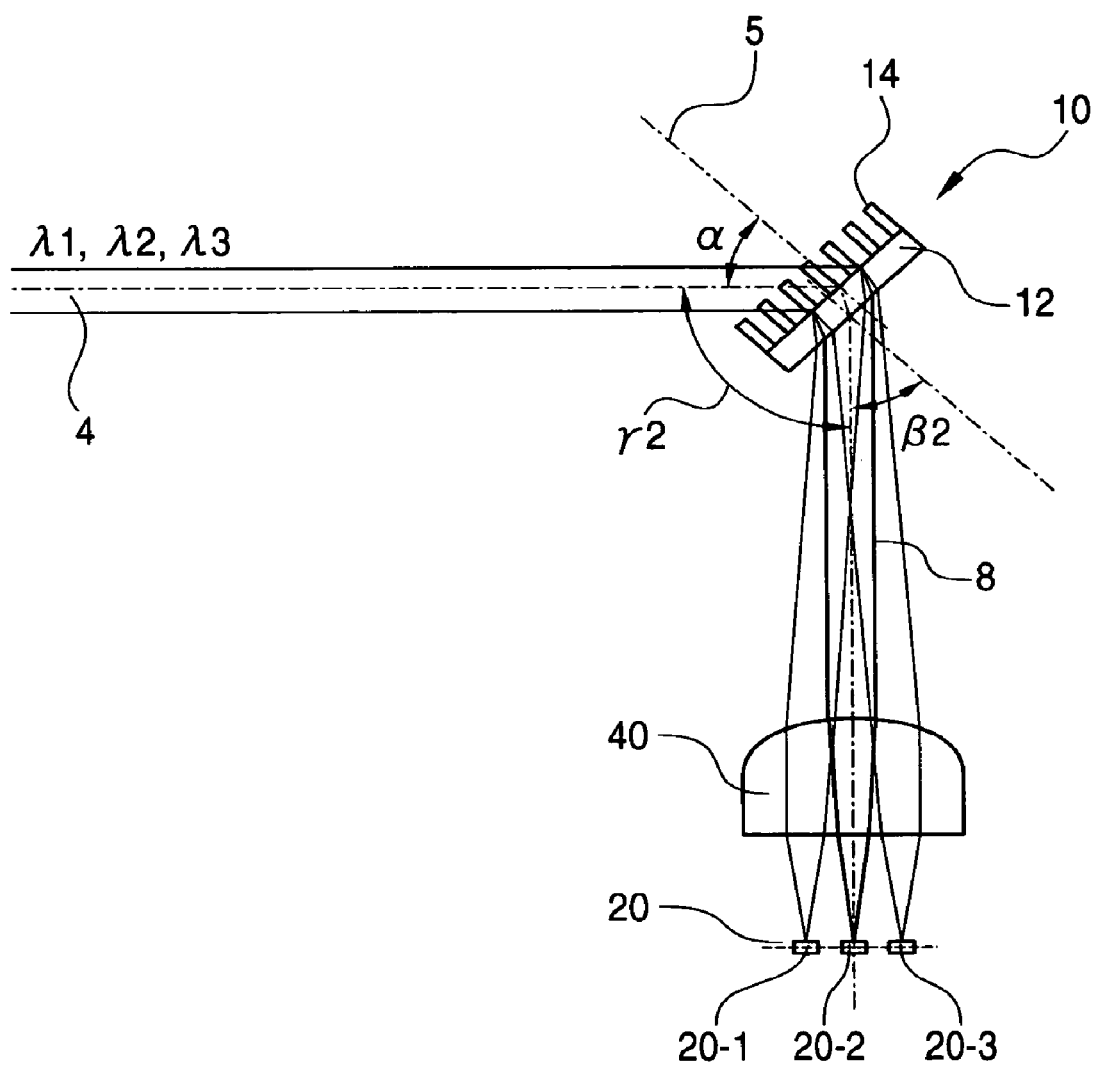
FIG. 5 is a view for explaining a basic optical system of another optical module according to the invention.

For example, as shown in FIG. 5, incident light 4 containing wavelength components λ1, λ2 and λ3 is made incident on the transmission-type diffraction grating 10. Light beams 8 diffracted by the diffraction grating 10 outgo in different directions in accordance with the wavelengths. For example, the diffracted light beam component of the wavelength λ2 outputs in such a direction that the angle (diffraction angle) between the optical axis 7 of the diffracted light beam component and a perpendicular line 5 drawn from a substrate 12 of the diffraction grating 10 is β2. The diffracted light beam component is converged by a converging lens 40 which is a converging device, and made incident on a corresponding photodetector 20-2 in a photodetector array 20 which is the diffracted light detection device.

In the invention, the light input device for making approximately parallel light beams incident on the optical module may be a laser beam source or an optical fiber collimator or may be a combination of a divergent light source and a collimator lens. The converging device may be a convergent mirror or a diffraction optical element other than the converging lens. If the diffraction optical element which is a spectral distributing element has a converging function in itself, it is not necessary to provide any special converging device. The diffracted light detection device may be photodetectors such as photo diodes or may be optical fibers.

Although FIG. 5 shows the case of three wavelengths for the sake of simplification, incident light may contain a large number of wavelength components (not smaller than two wavelength components) or may be light having a continuous wavelength distribution. Elements of the diffracted light detection device may be arranged in accordance with a necessary number of channels.

As an example, consider now the case where light with wavelengths λ1=1550 nm, λ2=1570 nm and λ3=1590 nm is made incident on the transmission-type diffraction grating having 900 grooves per mm at an incident angle of 45°. In the case of this embodiment, the expression (2) is almost satisfied by the wavelength λ2.

Figure 6:
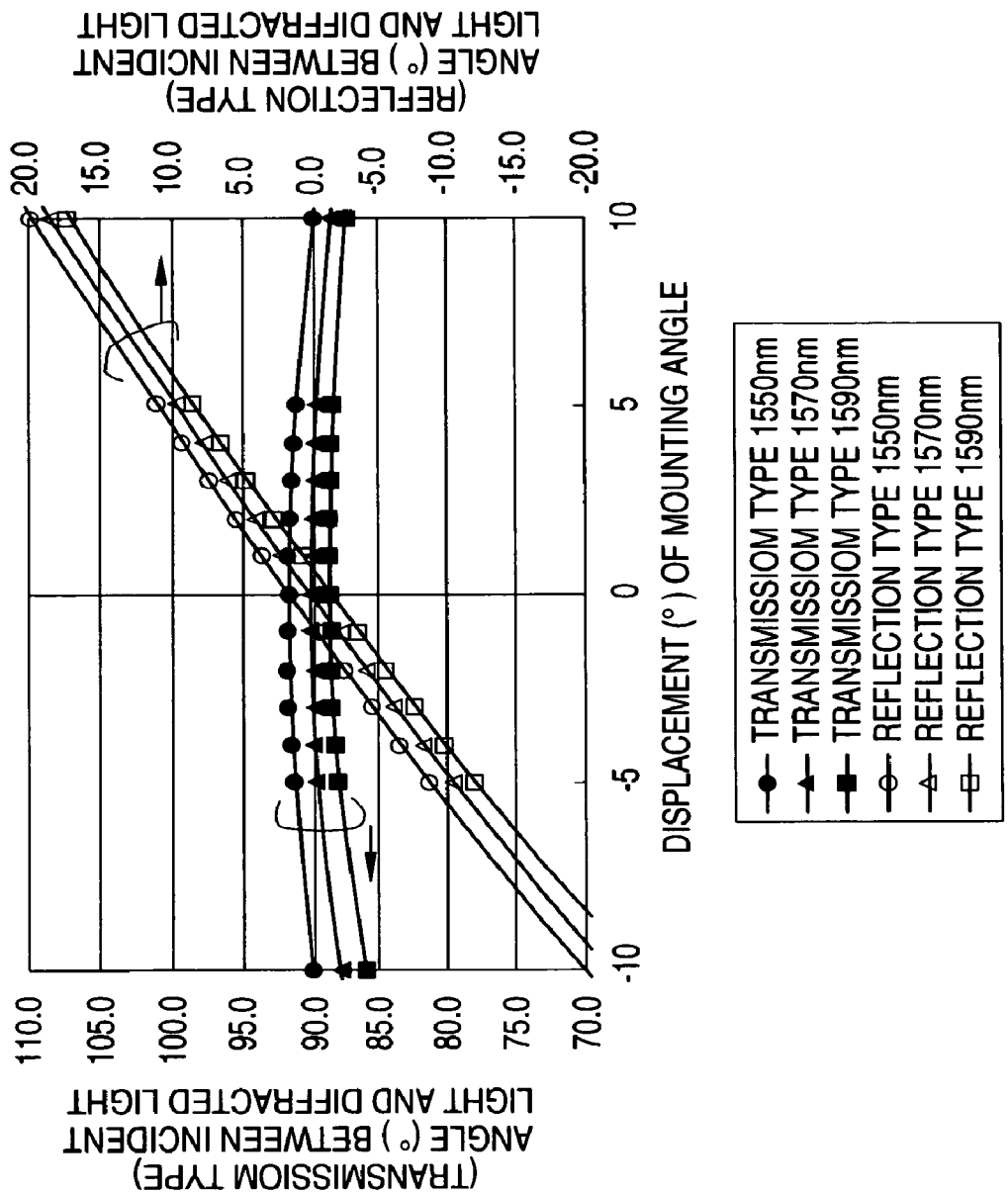
FIG. 6 is a graph showing characteristic difference between a transmission-type diffraction grating and a reflection-type diffraction grating.

Table 3 and FIG. 6 show the angle between incident light and diffracted light in the case where the angle (hereinafter referred to as "diffraction grating mounting angle") between the diffraction grating and the approximately parallel light beams as incident light is shifted from a predetermined angle (α=45° in this embodiment) in the aforementioned condition.

It is apparent from Table 3 that the quantity of change in the angle between incident light and diffracted light in the case of the transmission-type diffraction grating is not larger than 0.3° even when the diffraction grating mounting angle is shifted by ±5°.

That is, the positional relation between the collimator as an incident light source and the converging lens and photodetector for receiving diffracted light may be kept constant regardless of the diffraction grating mounting angle.

Figure 16:
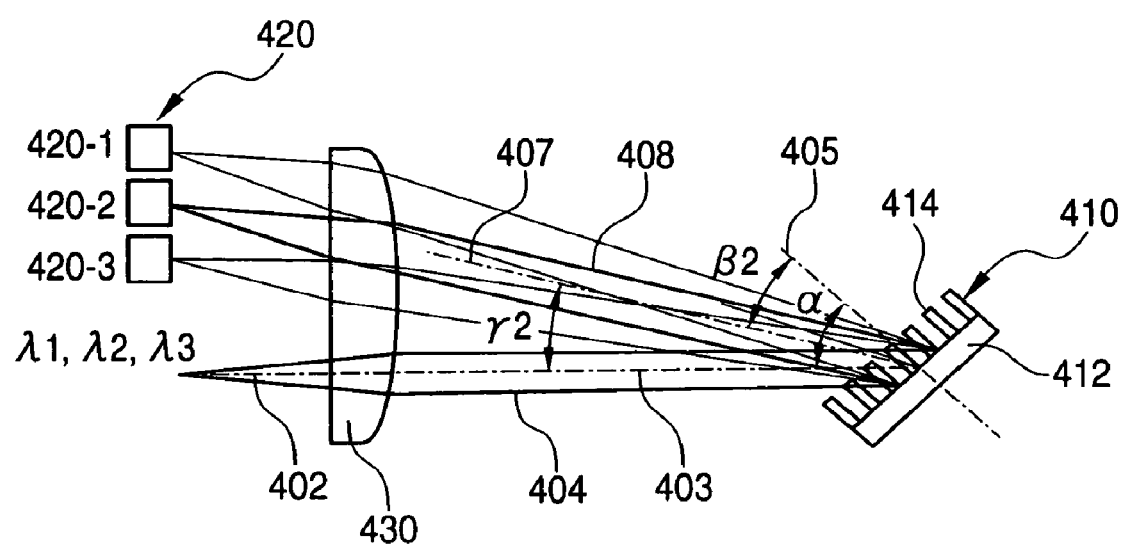
FIG. 16 is a view for explaining a spectrometric optical system using a reflection-type diffraction grating according to the related art.

On the other hand, consider a spectrometric optical system using a reflection-type diffraction grating shown in FIG. 16 in the case where light with wavelengths $\lambda 1=1550$ nm, $\lambda 2=1570$ nm and $\lambda 3=1590$ nm is made incident on the diffraction grating having 900 grooves per mm at an incident angle of 45° in the same manner as in the aforementioned example. Table 4 and FIG. 6 show the angle between incident light and diffracted light in the case where the diffraction grating mounting angle is shifted from a predetermined angle ($\alpha=45°$ in this embodiment).

It is apparent from Table 4 that the quantity of change in the angle between incident light and diffracted light in the case of the reflection-type diffraction grating reaches about 20° when the-diffraction grating mounting angle is shifted by ±50°.

That is, spectral distributed light cannot be guided to a corresponding photodetector unless the positional relation between the collimator as an incident light source and the converging lens and photodetector for receiving diffracted light is adjusted in accordance with the diffraction grating mounting angle.

It is apparent from Tables 3 and 4 and FIG. 6 that the stability of the transmission-type diffraction grating is not lower than 60 times the stability of the reflection-type diffraction grating in terms of the quantity of change in the angle between incident light and diffracted light.

This fact is equivalent to the fact that permissible angular error in the transmission-type diffraction grating is not smaller than 25 times the permissible angular error in the reflection-type diffraction grating when, for example, a converging lens with a focal length of 7.96 mm is used for generating a light spot received by a photodetector with an effective photodetecting width of 35 μm.

On the basis of the aforementioned fact, the optical module according to one aspect of the invention is characterized in that the optical module has the following mechanisms for holding respective constituent parts.

TABLE 3

| Displacement of Mounting Angle | Incident Angle | Angle (°) between Incident Light and Diffracted Light | | |
|---|---|---|---|---|
| ° | ° | λ = 1550 nm | λ = 1570 nm | λ = 1590 nm |
| −10 | 35 | 89.8 | 87.9 | 86.0 |
| −5 | 40 | 91.2 | 89.6 | 88.0 |
| −4 | 41 | 91.4 | 89.8 | 88.2 |
| −3 | 42 | 91.5 | 89.9 | 88.4 |
| −2 | 43 | 91.5 | 90.0 | 88.5 |
| −1 | 44 | 91.5 | 90.1 | 88.6 |
| 0 | 45 | 91.5 | 90.1 | 88.6 |
| 1 | 46 | 91.5 | 90.1 | 88.6 |
| 2 | 47 | 91.4 | 90.0 | 88.6 |
| 3 | 48 | 91.3 | 90.0 | 88.5 |
| 4 | 49 | 91.2 | 89.8 | 88.4 |
| 5 | 50 | 91.0 | 89.7 | 88.3 |
| 10 | 55 | 89.8 | 88.6 | 87.3 |

TABLE 4

| Displacement of Mounting Angle | Incident Angle | Angle (°) between Incident Light and Diffracted Light | | |
|---|---|---|---|---|
| ° | ° | λ = 1550 nm | λ = 1570 nm | λ = 1590 nm |
| −10 | 35 | −20.2 | −22.1 | −24.0 |
| −5 | 40 | −8.8 | −10.4 | −12.0 |
| −4 | 41 | −6.6 | −8.2 | −9.8 |
| −3 | 42 | −4.5 | −6.1 | −7.6 |
| −2 | 43 | −2.5 | −4.0 | −5.5 |
| −1 | 44 | −0.5 | −1.9 | −3.4 |
| 0 | 45 | 1.5 | 0.1 | −1.4 |
| 1 | 46 | 3.5 | 2.1 | 0.6 |
| 2 | 47 | 5.4 | 4.0 | 2.6 |
| 3 | 48 | 7.3 | 6.0 | 4.5 |
| 4 | 49 | 9.2 | 7.8 | 6.4 |
| 5 | 50 | 11.0 | 9.7 | 8.3 |
| 10 | 55 | 19.8 | 18.6 | 17.3 |

EXAMPLES

Applied examples using the optical system according to the invention will be described below.

Example 1

Figure 7:
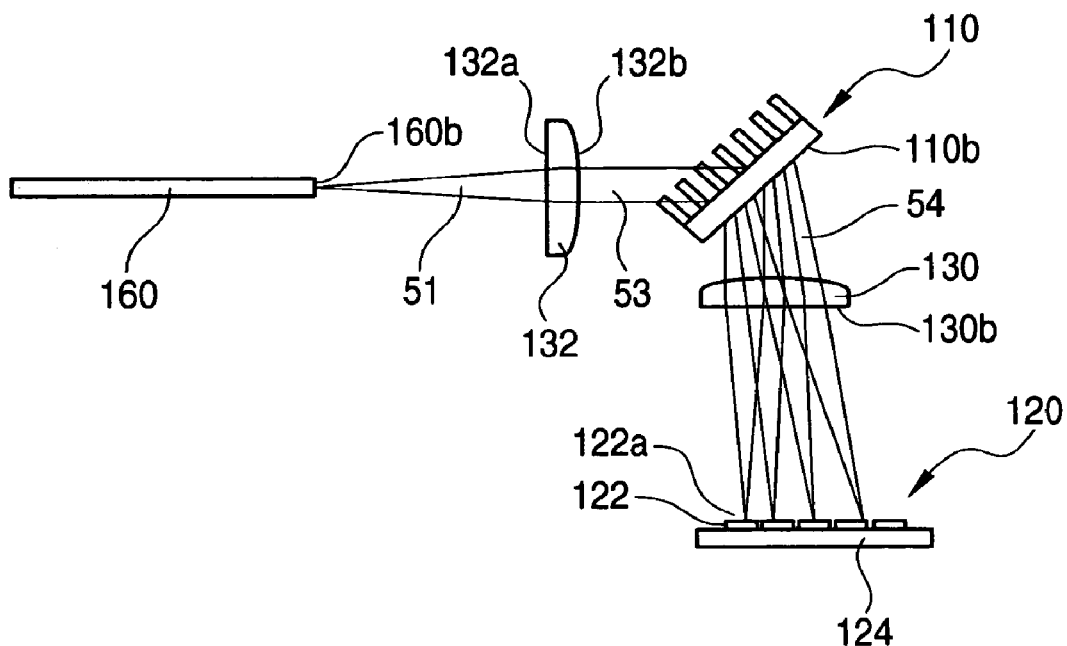
FIG. 7 is a view showing the configuration of a light demultiplexing module using the 90° optical path changing optical system according to Example 1 of the invention.

In Example 1, a transmission-type diffraction grating is used for changing an optical path. As known well, the transmission-type diffraction grating has a spectral distributing function exhibiting different diffraction angles in accordance with wavelengths. Accordingly, an example using such a spectral distributing function in addition to the optical path changing will be described. FIG. 7 shows the case of Example 1 using the optical system according to the invention.

Example 1 shows a demultiplexing module including an optical fiber 160, a collimator lens 132, a transmission-type diffraction grating 110, a converging lens 130, and a photodetector array 120.

A planoconvex lens with a diameter of 4 mm and a focal length f of 7.96 mm with respect to a wavelength of 1550 nm is used as each of the collimator lens 132 and the converging lens 130. A deep-groove laminar diffraction grating having an effective area of 4×6 mm and having 900 grooves per mm is used as the diffraction grating 110. The grating portion is provided as a two-layer structure with $SiO_2$ and $Ta_2O_5$. The depth of each groove is about 1.45 μm. The ratio of the width of each flue to the pitch of the grooves (duty ratio) is set to 0.5. An array in which photodetectors 122 each having an effective photodetecting surface with a size of 35 μm×100 μm are arranged at intervals of 200 μm is used as the photodetector array 120.

Light 51 with multiplexed wavelengths of 1510 nm, 1530 nm, 1550 nm and 1570 nm propagating through the optical fiber 160 outputs from an end surface 160*b* of the optical fiber and is incident on the collimator lens 132. The distance from the end surface 160*b* of the optical fiber to a first surface 132*a* of the collimator lens is set to about 6.21 mm. The light output from a second surface 132*b* of the collimator lens is provided as parallel light beams 53 approximately. The parallel light beams 53 are incident at an incident angle of about 45° on a surface of the diffraction grating. The output light beams 54 diffracted by the diffraction grating 110 outgo from the substrate surface 110*b* of the diffraction grating at different angles according to the wavelengths.

A reflection reducing film (not shown) made of a dielectric multilayer film is provided on the substrate surface 110*b*. The output light beams 54 incident on the converging lens 130 are converged by the converging lens 130 and then incident on the photodetectors 122 of the photodetector array 120 in accordance with the wavelengths respectively. On this occasion, the surface of the substrate 124 on which the photodetector array is mounted, that is, the photodetecting surfaces 122a of the photodetectors 122 are fixed in parallel to the optical axis of the optical fiber 160. The distance from the second surface 130b of the converging lens to the photodetecting surfaces 122a of the photodetectors 122 is set to about 6.17 mm.

In this case, because the number of grooves in the diffraction grating is equal to that in the aforementioned diffraction grating, the angle between the incident light with a wavelength of 1570 nm and the output light becomes about 90°. That is, when the aforementioned configuration is used, both demultiplexing and 90° optical path changing can be achieved simultaneously. Because it is not necessary to use any mirror, it is possible to reduce the number of parts and it is easy to assemble/align an optical system. The collimator lens, the diffraction grating and the converging lens can be mounted in an area of 10×10 mm, so that the size of the demultiplexing module can be reduced extremely.

Although this example shows the case where the wavelengths of the incident light are discrete, the invention can be applied also to the case where the wavelengths exhibit continuous wavelength spectra. In this case, the output angle of the diffracted light changes continuously but a light beam with a predetermined wavelength can be detected when a photodetector is placed on a predetermined position.

Example 2

Figure 8:
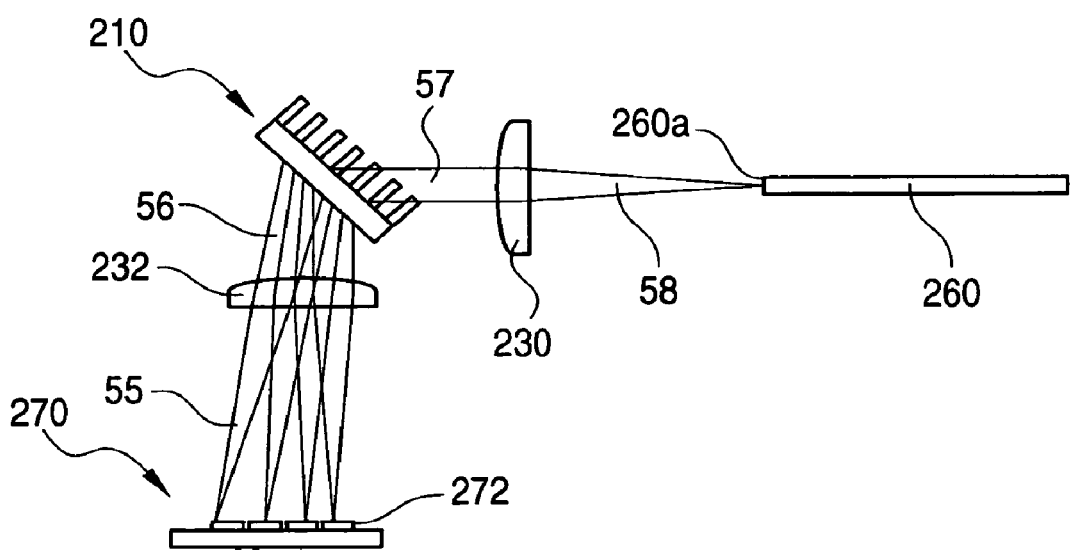
FIG. 8 is a view showing the configuration of a light multiplexing module using the 90° optical path changing optical system according to Example 2 of the invention.

Although the above description has been made on the case where a light demultiplexing module is formed, the same optical system as described above may be used for forming a light multiplexing module as shown in FIG. 8. As for the constituent members of the optical system, the photodetector array in FIG. 7 is replaced with a light-emitting element array.

In the light-emitting element array 270, four surface light-emitting semiconductor laser elements 272 each having an effective light-emitting surface with a diameter of 50 μm are arranged at intervals of 200 μm. The laser elements emit light beams with wavelengths of 1510 nm, 1530 nm, 1550 nm and 1570 nm respectively. The light beams 55 output from the laser elements 272 respectively are collimated to parallel light beams 56 approximately by a collimating lens 232. The parallel light beams 56 are incident at an incident angle of about 45° on a surface of the diffraction grating. The light beams with the wavelengths diffracted by the diffraction grating 210 are multiplexed and outputted as a wavelength-division multiplexed light beam. The output light 57 incident on the converging lens 230 is converged by the converging lens 230 and then coupled with an end surface of the optical fiber 260.

When the aforementioned configuration is used, both multiplexing and 90° optical path changing can be achieved simultaneously. Because it is not necessary to use any mirror, it is possible to reduce the number of parts and it is easy to assemble/align an optical system. The collimator lens, the diffraction grating and the converging lens can be mounted in an area of 10×10 mm, so that the size of the multiplexing module can be reduced greatly.

The configuration shown in FIG. 7 and the configuration shown in FIG. 8 may be used in combination. That is, wavelength-division multiplexed light propagating through an optical fiber is demultiplexed by a light demultiplexing module. After electrical processing such as modulation is applied to the demultiplexed light beams in accordance with wavelengths, the light beams are multiplexed by a light multiplexing module so that the resulting light beam can be coupled again as a wave-division multiplexed light beam with an optical fiber. In this case, when photodetectors, light-emitting elements and an electronic circuit are integrated on a board, that is, when a so-called opto-electronic hybrid circuit board is formed, the size of the optical module can be reduced as a whole.

Example 3

Figure 9:
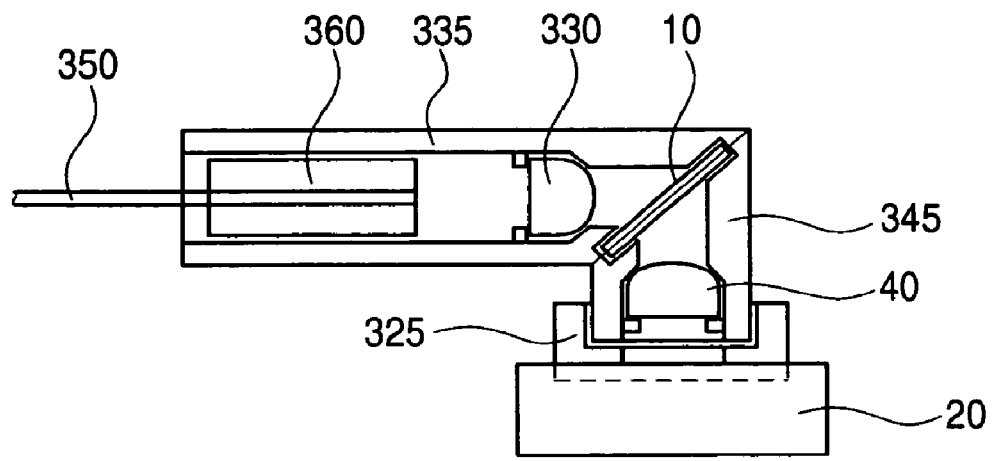
FIG. 9 is a sectional view showing an embodiment of the optical module according to Example 3 of the invention.
Figure 10:
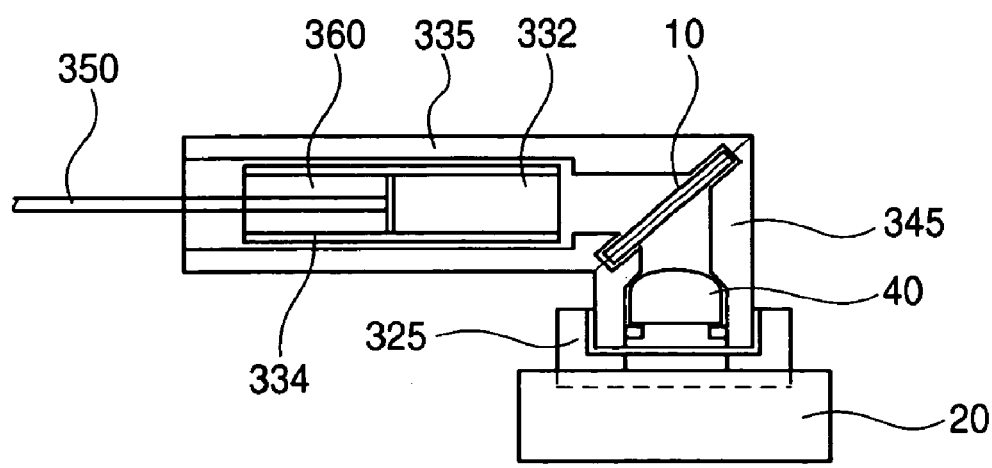
FIG. 10 is a sectional view showing Example 3 of the optical module according to the invention.

FIGS. 9 and 10 show Example 3 according to the invention.

FIG. 9 is a sectional view taken along the center axis of the optical module according to the invention. The light input device is a collimator having an optical fiber 350, and a collimator lens 330. Light output from an end surface of the optical fiber 350 is collimated to parallel light beams. The parallel light beams are made incident on the transmission-type diffraction grating 10. The collimator is held by a first holding member (collimator holding member) 335. The collimator holding member 335 is cylindrical so that the collimator lens 330 and a ferrule 360 for holding the optical fiber 350 are inserted and held in a hollow portion of the cylinder of the collimator holding member 335. The hollow portion is circular in section and forms an optical path of parallel light flux output from the collimator.

Light diffracted by the diffraction grating is converged on the photodetectingsurface of the photodetector array 20 as the diffracted light detection device by a converging lens 40. The converging lens 40 is held by a second holding member (converging lens holding member) 345. Also the converging lens holding member 345 is circular so that the converging lens 40 is inserted and held in a hollow portion of the cylinder of the converging lens holding member 345. The hollow portion is circular in section and forms an optical path of diffracted light output from the diffraction grating.

The transmission-type diffraction grating 10 is held so as to be put between end surfaces of the collimator holding member 335 and the converging lens holding member 345.

Moreover, a third holding member (photodetector holding member) 325 for holding the photodetector array 20 is connected to the converging lens holding member. The connection portion between the photodetector holding member 325 and the converging lens holding member will be described later in detail.

Although the aforementioned example shows the case where the optical fiber 350 held in the ferrule 360 and a planoconvex lens as the collimator lens 330 are fixed by the collimator holding member 335, a graded index rod lens etc. may be used as the collimator lens. Alternatively, an optical fiber collimator produced in advance as shown in FIG. 10 may be fixed into the collimator holding member 335. The optical fiber collimator is formed such that the ferrule 360 for fixing the optical fiber 350 and the graded index rod lens 332 are fixed into a tube member 334.

Figure 11A:
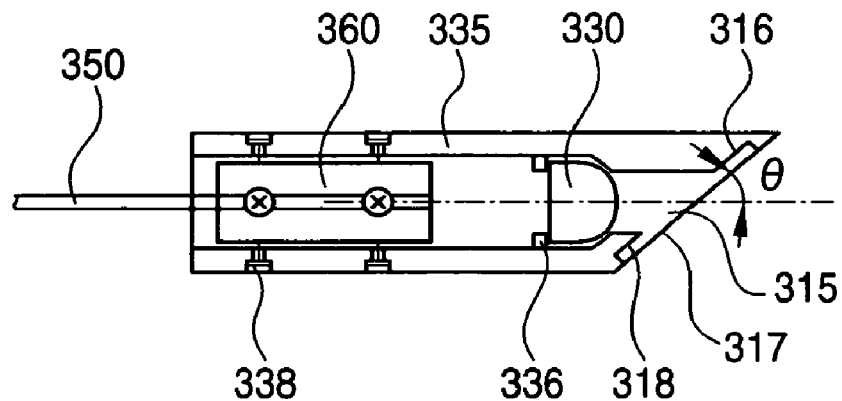
FIGS. 11A and 11B are sectional views showing the configuration of a collimator holding member according to Example 3.
Figure 11B:
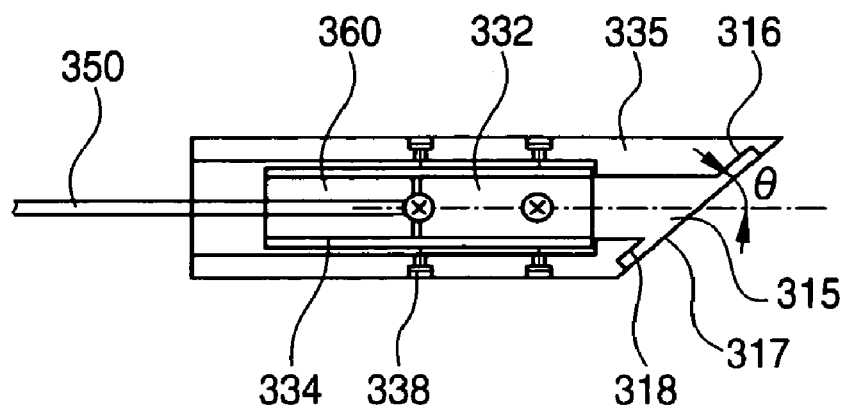

In assembling of the optical fiber collimator, the distance between the light-output end surface of the optical fiber and the lens and the elevation angle of the optical axis of the optical fiber and/or lens need to be adjusted as a condition for obtaining good parallel light beams. In the optical module according to the invention, the adjusting mechanism is provided in the collimator holding member. Specifically, an adjusting mechanism using screws is provided as in an example shown in FIG. 11A or 11B. In the example shown in FIG. 11A, there is used a measure in which screw holes are provided in symmetric positions on a side surface of the collimator holding member 335 so that the optical axis of the ferrule 360 is adjusted and fixed in accordance with the push-in quantity of adjusting screws 338. In the example shown in FIG. 11B, the optical fiber collimator is adjusted as a whole in the same manner.

As described above, the transmission-type diffraction grating 10 is held so as to be put between end surfaces of the collimator holding member 335 and the converging lens holding member 345. Therefore, the light-output opening side end surface 317 of the collimator holding member 335 is processed so obliquely as to be equal to the diffraction grating mounting angle θ with respect to the optical axis.

When a diffraction grating holding portion 315 provided in an end surface of the collimator holding member 335 is combined with a diffraction grating holding portion provided in an end surface of the converging lens holding member, a cavity 318 is formed so that the diffraction grating substrate is fitted into the cavity 318 between end surfaces partially abutting on each other. It is particularly preferable that the depth of the cavity 318 for fitting the diffraction grating is 51-53% the thickness of the diffraction grating substrate 312 in order to prevent the diffraction grating from being broken and shifted. A cavity is also provided in an end surface of the converging lens holding member 345. In the case of the transmission-type diffraction grating as described above, it is not necessary to provide any mechanism for adjusting the mounting angle specially because the permissible error of the mounting angle is large.

Figure 12A:
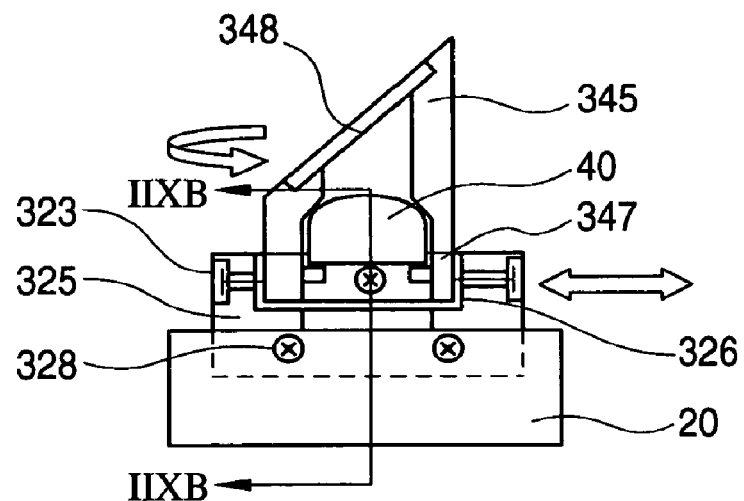
FIGS. 12A and 12B are sectional views showing the configuration of a converging lens holding member and a photodetector holding member according to Example 3.
Figure 12B:
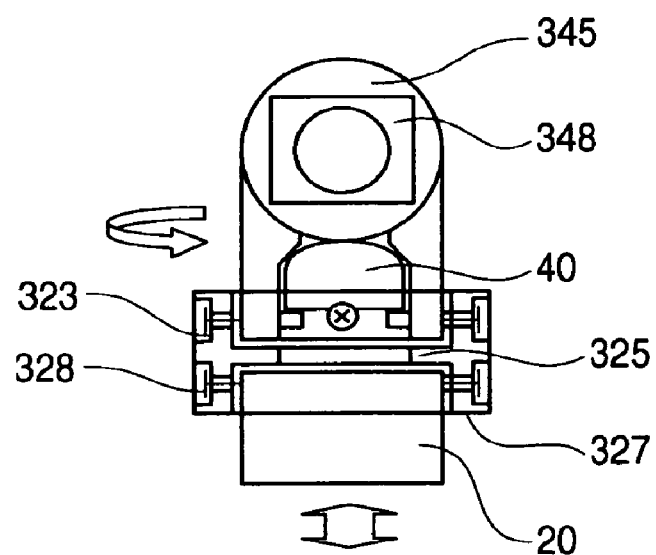

As shown in FIGS. 12A and 12B, a structure is provided on a side of the converging lens holding member 345 opposite to a diffraction grating holding portion 348 so that the structure can be fitted to the photodetector holding member 325 and can rotate around the optical axis. An end portion 347 of the converging lens holding member 345 fitted to the photodetector holding member 325 is particularly shaped like a cylinder. A through-hole 326 shaped like a circle in section is provided in a portion of the photodetector holding member 325 fitted to the end portion 347 of the converging lens holding member 345. The inner diameter of the through-hole 326 is formed to be slightly larger than the outer diameter of the cylindrical end portion 347 of the converging lens holding member 345 so that the through-hole 326 and the cylindrical end portion 347 can be rotatably fitted to each other.

The photodetector holding member 325 needs to have a mechanism for holding the photodetector array 20 as well as a structure fitted to an end portion of the converging lens holding member 345. For example, as shown in FIG. 12B, the package of the photodetector array 20 is fitted and held into a U-shaped portion 327 provided in the photodetector holding member 325. Incidentally, FIG. 12B is a sectional view along the line taken with the arrows XIIB-XIIB in FIG. 12A.

The photodetector array 20 can be slid in the direction of arrangement of the photodetectors along the U-shaped portion 327. Screw holes are provided in the U-shaped portion 327 of the photodetector holding member 325. The photodetector array 20 is fixed by fixation screws 328 after the photodetector array is positioned in the direction of arrangement of the photodetectors and in a direction perpendicular to the photodetecting surface.

Because the photodetector holding member 325 can rotate relative to the converging lens holding member 345 for holding the diffraction grating, the direction of diffraction of different wavelengths by the diffraction grating (the direction of dispersion) can be adjusted to coincide with the direction of arrangement of the photodetectors. After the adjustment, the photodetector holding member 325 is fixed by fixation screws 323 provided in the photodetector holding member.

Although the aforementioned example has shown an optical system using a diffraction grating for bending incident light by about 90°, the bending angle is not limited to 90°. When the bending angle is 90°, each of the diffraction grating holding portion of the collimator holding member and the diffraction grating holding portion of the converging lens holding member is processed at an angle of 45° with respect to the axis. When the diffraction grating needs to be fixed at another angle, the sum of the angle between the end surface of the collimator holding member and the axial direction and the angle between the end surface of the converging lens holding member and the axial direction is set to be within a range of the angle between incident light and diffracted light.

The specific configuration of a small-size spectral distributing module will be described below as an embodiment of the invention.

This embodiment shows a spectral distributing module having the basic configuration shown in FIG. 9. The spectral distributing module includes an optical fiber chip, a collimator lens, a transmission-type diffraction grating, a converging lens, and a photodetector array.

A quartz single mode optical fiber 350 fixed into a columnar ferrule 360 with an outer diameter of 4 mm was used as the optical fiber chip. A planoconvex lens made of BK7 and having a diameter of 4 mm and a focal length f of 7.96 mm with respect to a wavelength of 1550 nm was used as the collimator lens 330.

The collimator holding member 335 was made of an aluminum cylinder with a length of 30 mm, an outer diameter of 8 mm and an inner diameter of 4 mm. The aluminum cylinder was processed so that an end surface on a side of the cylinder was inclined at 45° to the axis of the cylinder. A cavity was formed in the end surface so that the diffraction grating 10 could be fitted into the cavity. Screw holes of M1.4 were provided at two places in each of four directions of a side surface of the cylinder, that is, screw holes were provided at eight places in total, so that there was provided a mechanism for fixing the position of the optical fiber by screwing and adjusting the elevation angle of the optical fiber by the push-in quantity of each screw. The holding member was subjected to a black alumite process in order to prevent stray light.

The same planoconvex lens as used for the collimator lens was used for the converging lens 40.

The converging lens holding member 345 was shaped like a cylinder having a length of 6 mm, an outer diameter of about 8 mm and an inner diameter of 4 mm. The converging lens holding member 345 was made of aluminum subjected to a black alumite process in the same manner as in the collimator holding member. An end surface of the converging lens holding member 345 was processed so as to be inclined at 45° to the axis of the cylinder. The outer circumference of the other end portion of the converging lens holding member 345 was processed so that an outer diameter of 6 mm was obtained on a length of 3 mm so that the converging lens holding member 345 could be fitted to the photodetector holding member 325.

A deep-groove laminar diffraction grating having an effective area of 4×6 mm and having 900 grooves per mm was used as the diffraction grating 10. The diffraction grating was formed on a quartz substrate. The grating portion was formed as a two-layer structure with $SiO_2$ and $Ta_2O_5$. The depth of each groove was about 1.45 μm. The ratio of the width of each groove to the pitch of the grooves (duty ratio) was set to 0.5. The thickness of the diffraction grating substrate was set to 2 mm.

The diffraction grating was fixed so that its grating surface was disposed as a light incidence surface on the collimator holding member 335 side while its substrate rear surface was disposed as a light output surface on the converging lens holding member 345 side. For fixation, there was used a method of fitting the diffraction grating 10 into a cavity formed in the diffraction grating holding portion of the collimator holding member 335 and then screwing the collimator holding member 335 to the converging lens holding member 345 while clamping the diffraction grating 10 by the converging lens holding member 345.

An arrangement of 22 photodetectors arranged at intervals of 50 µm and each having an effective photodetecting surface with a size of 35 µm×100 µm was used as the photodetector array 20. That is, the photodetector array 20 had an arrangement of 22 channels.

The photodetector holding member 325 was made of aluminum subjected to a black alumite process. The photodetector holding member 325 was formed in a U-shape having a 10 mm-square upper surface and, about 5 mm-long legs. A through-hole with a diameter of about 6.1 mm was formed in the upper surface so as to be fitted to the converging lens holding member 345. Screw holes of M1.7 were provided in side walls of the upper surface. After the photodetector holding member 325 was fitted to the converging lens holding member 345, the converging lens holding member 345 was fixed by screwing. The photodetector array 20 was fitted into the U-shaped portion of the photodetector holding member 325 and fixed by an adhesive agent.

Although the respective holding members can be fixed to one another by screwing, it is preferable that the holding members are finally fixed by a thermosetting adhesive agent or the like.

Although the embodiment has shown the case where the collimator holding member and the converging lens holding member are cylindrical, the section of the outer shape is not limited to a circular shape. It is preferable that the shape is selected in accordance with the condition for fixing this module into a housing. Although it is generally preferable that the section of each hollow portion is circular because the hollow portion is provided as an optical path of light flux, the sectional shape of the hollow portion is not always limited thereto. The sizes, angles, materials, etc. of the respective holding members and elements are shown as an example but are not limited to the example.

On the basis of the aforementioned configuration, the respective optical elements were disposed as follows.

Figure 13:
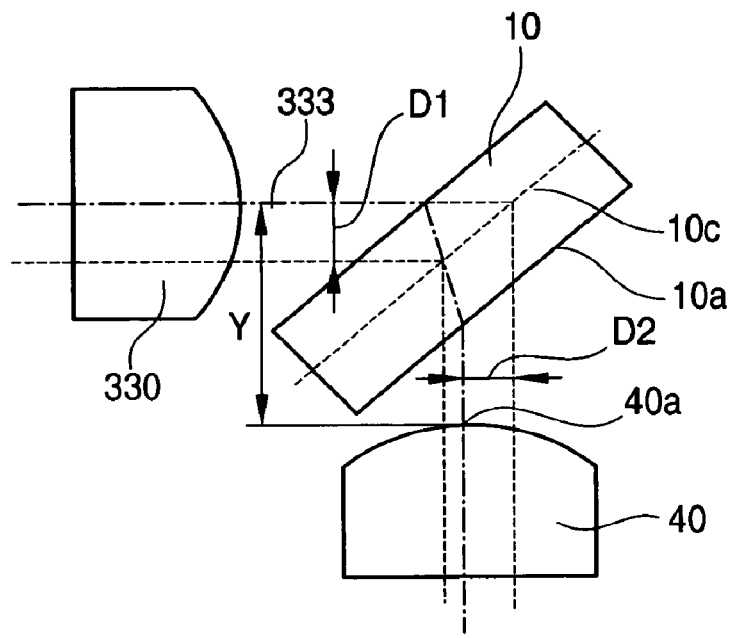
FIG. 13 is a view for explaining an optical system in the periphery of the diffraction grating of the optical module according to Example 3 of the invention.

The distance from an end surface of the optical fiber 350 to the first surface of the collimator lens 330 was set to about 6.21 mm. As shown in FIG. 13, the distance Y between the optical axis 333 of the collimator lens 330 and the vertex of the first surface 40a of the converging lens was set to 4.0 mm. The displacement D1 of the optical axis 333 of the collimator lens 330 from a line passing through the center line 10c of the substrate of the diffraction grating 10 and parallel to the optical axis 333 of the collimator lens 330 was set to 1.1 mm. The displacement D2 of the optical axis 343 of the converging lens 40 from an axis obtained by turning the optical axis 333 of the collimator lens 330 by 90° at an axis passing through the center line 10c of the diffraction grating substrate and parallel to the surface 10a of the diffraction grating was set to 0.8 mm. The respective elements were disposed so that the distance from the second surface of the converging lens 340 to the front surface of each photodetector was set to about 6.17 mm.

Light having a continuous spectrum in a range of from 1470 nm to 1590 nm was made incident on the optical fiber 350 of the spectral distributing module produced thus. After the light was collimated to approximately parallel light beams by the collimator lens 330, the approximately parallel light beams were made incident at an incident angle of about 45° on the diffraction grating surface. The light beams diffracted thus by the diffraction grating 10 output from the substrate surface of the diffraction grating at different angles in accordance with the wavelengths. The output light beams (diffracted light) were incident on the converging lens 340 and converged by the converging lens 340 so as to be incident on the respective photodetectors of the photodetector array 20 in accordance with the wavelengths. In this configuration, it was possible to obtain spectral distributing characteristic exhibiting wavelength resolving power of about 5 nm.

The module including the housing and the photodetector array could be mounted in a space of 20×40×10 mm, so that the size of the spectral distributing module can be reduced greatly.

What is claimed is:

1. An optical module comprising:
   an optical system using a diffraction optical element for bending an optical axis of an incident light beam with a specific wavelength at about 90°, wherein the diffraction optical element is a transmission-type diffraction grating, a number N of grooves in the transmission-type diffraction grating is represented by the formula:

$$N=\pm(\cos\alpha+\sin\alpha)/(m\lambda)$$

in which ± is the same sign as that of m when an mth-order diffracted light beam is used in a condition that the light beam with the specific wavelength λ is incident at an incident angle α on the transmission-type diffraction grating wherein a substrate of the transmission-type diffraction grating is mounted at an angle in a range of α±5° with respect to the incident light beam, wherein:
   the substrate of the transmission-type diffraction grating is mounted at an angle in the range of α+Δθ with respect to the incident light beam, where Δθ represents a shift in the transmission-type diffraction grating mounting angle;
   a light beam diffracted by the transmission-type diffraction grating is converged by a lens with a focal length f so as to be incident on a photodetector having a photodetecting surface with a width W along a direction of the incident light beam; and
   that is satisfied the relation:

$$\tan|\Delta\theta|\leq W/(2f).$$

2. An optical module according to claim 1, further comprising:
   a light input device for making a light beam with multiplexed wavelengths incident on the transmission-type diffraction grating using one of the wavelengths as the specific wavelength; and
   a plurality of photodetectors for receiving respective light beams each having a single wavelength demultiplexed by the transmission-type diffraction grating and output from the transmission-type diffraction grating.

3. An optical module according to claim 2, wherein the light input device for making the light beam incident on the transmission-type diffraction grating is an optical fiber or waveguide which is fixed so that an optical axis is in parallel with a board on which the optical module is mounted;
   the transmission-type diffraction grating is fixed so that the light beam with the specific wavelength outputs in a direction approximately perpendicular to the board when the light beam is incident on the transmission-type diffraction grating; and
   a photodector for receiving respective light beams each having a single wavelength output from the transmission-type diffraction grating are a plurality of flat photodetecting elements which are arranged, in parapple to the optical axis, in respective positions where the light beams each having single wavelength output from the transmission-type diffraction grating reach the board.

4. An optical module according to claim 1, wherein the first mentioned optical system forms a light demultiplexing module, further comprising:

a second optical system forming a light multiplexing module using a second diffraction optical element for bending an optical axis of an incident light beam with a specific wavelength at about 90°, wherein the diffraction optical element is a transmission-type diffraction grating, a number N of grooves in the transmission-type diffraction grating is represented by the formula:

$$N=\pm(\cos\alpha+\sin\alpha)/(m\lambda)$$

in which ± is the same sign as that of m when an mth-order diffracted light beam is used in a condition that the light beam with the specific wavelength λ is incident at an incident angle α on the transmission-type diffraction grating wherein a substrate of the transmission-type diffraction grating is mounted at an angle in a range of α±5° with respect to the incident light beam;

a plurality of light-emitting devices for emitting light beams with different wavelengths; and a photodetector for receiving a light beam with multiplexed wavelengths output from the second transmission-type diffraction grating such that the light beams emitted from the plurality of light-emitting devices are multiplexed by the transmission-type diffraction grating, wherein the specific wavelength is one of the wavelengths.

5. An optical module according to claim 4, further comprising:

a light input device for making a light beam with multiplexed wavelengths incident on the transmission-type diffraction grating using one of the wavelengths as the specific wavelength; and a plurality of photodetectors for receiving respective light beams each having a single wavelength demultiplexed by the transmission-type diffraction grating and output from the transmission-type diffraction grating.

6. An optical module according to claim 5 wherein the light input device for making the light beam incident on the transmission-type diffraction grating is an optical fiber or waveguide which is fixed so that an optical axis is in parallel with a board on which the optical module is mounted;

the transmission-type diffraction grating is fixed so that the light beam with the specific wavelength outputs in a direction approximately perpendicular to the board when the light beam is incident on the transmission-type diffraction grating; and a photodector for receiving respective light beams each having a single wavelength output from the transmission-type diffraction grating are a plurality of flat photodetecting elements which are arranged, in parallel to the optical axis, in respective positions where the light beams each having single wavelength output from the transmission-type diffraction grating reach the board.

7. An optical module according to claim 4, wherein wavelength-division multiplexed light propagated through an optical fiber is demultiplexed by the light demultiplexing module and, after electrical processing is applied to the demultiplexed light beams in accordance with wavelengths, the light beams are multiplexed by the light multiplexing module so that the resulting light beam can be coupled again as a wave-division multiplexed light beam with an optical fiber, wherein the photodetectors, the light-emitting elements and an electronic circuit are integrated on an opto-electronic hybrid circuit board.

8. An optical module according to claim 1, further comprising:

a light input device for making a light beam having continuous wavelength spectra in a predetermined wavelength range incident on the transmission-type diffraction grating; and wherein the photodetector receives a light beam with a predetermined wavelength spectrally distributed by the transmission-type diffraction grating and output from the transmission-type diffraction grating, wherein the specific wavelength is in the predetermined wavelength range of the incident light beam.

* * * * *